2,951,263
TREATMENT OF POLYHYDRIC ALCOHOLS

Irving H. Cooper, Maywood, N.J., assignor to Heyden Newport Chemical Corporation, New York, N.Y., a corporation of Delaware No Drawing. Filed Oct. 30, 1957, Ser. No. 693,270

5 Claims. (Cl. 18—47.5)

The present invention relates to a novel method of treating polyhydric alcohols. More particularly it relates to a method of converting pentaerythritol and trimethylolethane into a particle form which is free of dust.

Pentaerythritol produced commercially generally contains a considerable amount of finely-divided particles or dust. This dust, which readily becomes airborne during handling, constitutes a health hazard, and its presence in pentaerythritol is undesirable. While pentaerythritol can be crystallized under carefully controlled conditions to yield a product in the form of fairly large crystals, this procedure is relatively difficult to carry out and does not necessarily result in a dust-free product. The commercial material is usually screened or subjected to air classification to remove the dust from it. The dust so removed must then be reworked by recycling it through the crystallization steps of the pentaerythritol manufacturing process. Such a procedure is time consuming and economically undesirable.

Trimethylolethane is recovered from its reaction liquor as small crystals. These crystals, even when dried to a very low moisture content, tend to coalese on storage to a caked form which does not flow freely and which is difficult to handle.

This invention is concerned with a method by which finely-divided particles of pentaerythritol or trimethylolethane are converted into particles of a more desirable size, for example flakes, which are free of dust and which have little tendency to coalesce. I have found that when finely-divided particles of pentaerythritol or trimethylolethane which contain a very small amount of water are compacted, sheets of a polyhydric alcohol are obtained. After a brief ageing period these sheets are dried and if the sheets are large as is usually the case, the dried sheets may be subdivided into particles of any desired size. Alternatively the sheets can be dried during or after their sub-division.

The term "sheet" is used hereinafter to designate any thin, homogeneous layer of material regardless of its size or method of formation.

Commercially acceptable grades of pentaerythritol and trimethylolethane should be in a nearly anhydrous condition with the former containing less than 0.5% of moisture and the latter containing less than 0.05% of moisture. Products meeting these moisture requirements can be prepared by the present procedure.

The compacting of pentaerythritol or trimethylolethane by this procedure results in a material which has a greater density than does the starting material and which contains little or no dust. The other properties of the polyhydric alcohols are unaffected by this treatment. The polyhydric alcohols are light in color and can be used in the preparation of light-colored alkyd resins. This procedure can be applied to grades of pentaerythritol containing relatively large amounts of dust as well as to the dust isolated by screening or air classification.

Only small amounts of water need be added to the polyhydric alcohols that are to be densified by this procedure. With pentaerythritol 0.5% to 5.0% of water is used; approximately 1.5 to 2.0% is the preferred amount. With trimethylolethane 0.2% to 2.0% of water is used; approximately 0.5% to 0.8% is the preferred amount. In each case the amount of water specified is the total amount present and includes both combined and uncombined water. When less than the specified amount of water is added, the compacting procedure gives a low yield of thin, friable sheets. Recycling this material improves the yield somewhat but still does not yield satisfactory sheets of compacted polyhydric alcohol. The use of more than the specified amount of water results in a product that is difficult to handle and that requires a prolonged drying period to remove the water from the compacted sheet.

The temperature at which the densification is effected is not critical. For convenience it is generally carried out at room temperature; higher temperatures can be used, however, without affecting the results.

In this procedure the polyhydric alcohol containing a small amount of water is subjected for a brief period of time to sufficient pressure to cause the finely-divided particles to be formed into a homogeneous sheet. Any suitable apparatus, for example, a roller mill or a molding press, can be used to densify the material. A compacting mill was used in the examples that follow. This mill comprises a pair of cast steel rolls which are held face to face by a calibrated high tension spring system. The rolls rotate in opposite directions about parallel horizontal axes with the roll surfaces at the nip moving downwardly. It has been found that when the rolls are held together by a force of approximately 1,000 to 2,000 pounds per linear inch of effective roll face width quantitative or nearly quantitative yields of densified material are obtained. However, the amount of pressure required will vary somewhat depending upon the amount of water present and other factors. Thus a force of approximately 7,000 pounds may be used with rolls having a 6 inch effective face width, while a force of 12,000 to 15,000 pounds may be used with rolls having an 8 inch effective face width. When less pressure than the amount specified is used, low yields of densified material are obtained, the remainder of the material being recovered as dust. Recycling this material results in an improved yield, but the product usually remains dusty. Since higher pressures offer no improvement in the quality of the product and result in operational difficulties, they are not employed.

In the preferred embodiment of this process moist pentaerythritol or trimethylolethane is fed from a hopper into the nip of the rolls and is forced between the rolls as they rotate downwardly. Some or all of the finely-divided material is compacted into sheets as it passes between the rolls. The sheets of polyhydric alcohol are somewhat soft and flexible immediately after their formation. An ageing period of from 5 to 40 minutes during which the sheets harden and become brittle is desirable before the sheets are dried and broken into particles of the desired sizes.

Any suitable dryer, such as a hot air dryer or a steam tube dryer, can be used to remove moisture from the sheet of compacted polyhydric alcohol. The temperature at which the compacted material is dried is not critical. At relatively low temperatures, however, a longer drying period is required than is required at higher temperatures. Prolonged heating at tempertures above 100° C. should be avoided to prevent discoloration of the material. The heating is continued until the moisture content of the polyhydric alcohol meets the specifications that have been established for the commercial material, that is, less than 0.5% of water in pentaerythritol and less than 0.05% in trimethylolethane.

The sheets of polyhydric alcohol can be subdivided in any convenient way. One method which yields a dust-free, granular product comprises passing the sheets between corrugated rolls set at a small clearance and rotating at different speeds. The corrugations are a horizontal spiral on one roll and a vertical spiral on the other, giving a square cut between them. The sheets are fed first to the rolls which subdivide them into coarse particles and then to rolls which further reduce their size.

*Example 1*

The compacting mill used in this example had two cast steel rolls which were 6 inches in diameter and which had an effective face width of 6 inches. These rolls were held together by a calibrated spring system which exerted a maximum pressure of 7,000 pounds. The maximum pressure was used in carrying out this densification. The rolls revolved at a speed of 14 revolutions per minute.

Pentaerythritol dust obtained from a commercial screening operation and moistened to contain 1.6 to 1.8% of water was passed between the rolls at the rate of 144 pounds per hour. Approximately 96% of the dust was converted by this treatment to sheets approximately ⅛ inch thick and 1 to 2 inches in length and width. The sheets were allowed to age at room temperature for approximately 15 minutes and were then passed between a pair of corrugated rolls set at a clearance of 0.020 inch and rotating at differential speeds. After drying in a steam tube dryer to a moisture content of less than 0.5%, the product was in the form of dust-free, granular particles, 90% of which would not pass an 80 mesh screen but all of which would pass a 16 mesh screen. The pentaerythritol dust which originally weighed 36 pounds per cubic foot was densified by this treatment to 42 pounds per cubic foot.

*Example 2*

In this example the compacting mill was equipped with a pair of cast steel rolls having diameters of 8 inches and effective face widths of 8 inches. The rolls, which revolved at a speed of 15 revolutions per minute, were held together in a heavy cast frame by calibrated springs which exerted a maximum pressure of 15,000 pounds. The maximum pressure was used in this densification.

Pentaerythritol dust containing 2.5% of water was passed between the rolls at the rate of approximately 240 pounds per hour. The sheets of pentaerythritol obtained were aged, dried, and granulated as described in Example 1 to yield a dense, dust-free, granular product.

*Example 3*

The compacting mill used in this example was equipped with rolls 6 inches in diameter and 6 inches in effective face width. These rolls were held together with a force of 7,000 pounds.

Crystalline trimethylolethane which contained 0.5% of water was passed through the compacting mill at the rate of 185 pounds per hour to form a continuous sheet of trimethylolethane approximately 0.04 inch thick. This sheet was broken into large flakes which after a ten minute ageing period at room temperature were passed through granulating rolls having 6 corrugations to the inch and set at a clearance of 0.020 inch. The coarse granules obtained contained 0.11% moisture. Passage of these granules between rolls having 12 corrugations to the inch yielded finer granules, which contained 0.05% of water. This treatment increased the density of the trimethylolethane from 28 pounds per cubic foot to 36 pounds per cubic foot.

Heating the fine granules of trimethylolethane at 245° F. in a hot air oven caused them to sinter. On cooling to room temperature, however, the sintered cake became friable and was readily broken into granular particles.

The granulated trimethylolethane obtained by this procedure remains free-flowing and does not cake on storage at ordinary temperatures and humidities. The crystalline material used as the starting material in this example caked badly on storage.

I claim:

1. The process of treating particles of a polyhydric alcohol selected from the group consisting of pentaerythritol and trimethylolethane which comprises compressing said polyhydric alcohol particles containing approximately 0.2% to 5.0% of water thereby forming a sheet of compacted polyhydric alcohol, and thereafter drying said compacted sheet.

2. The process of treating particles of a polyhydric alcohol selected from the group consisting of pentaerythritol and trimethylolethane which comprises passing said polyhydric alcohol particles containing about 0.2% to 5.0% of water between two oppositely rotating rolls being held together with a force of at least 1,000 pounds per linear inch of effective face width of said rolls, thereby forming the polyhydric alcohol into a compacted sheet.

3. The process of treating particles of a polyhydric alcohol selected from the group consisting of pentaerythritol and trimethylolethane which comprises passing said polyhydric alcohol particles containing approximately 0.2%–5.0% of water between two oppositely rotating rolls, said rolls being held together with a force of approximately 1,000–2,000 pounds per linear inch of effective face width of said rolls, thereby forming said polyhydric alcohol into sheets, ageing the sheets for approximately 5 to 30 minutes, drying the sheets to form a polyhydric alcohol residue containing less than 0.5% of water, and subdividing said dried residue into flakes.

4. The process of treating pentaerythritol particles comprising passing pentaerythritol particles containing 1.5 to 2.0% of water between two oppositely rotating rolls held together with a force of approximately 1,000 pounds–2,000 pounds per linear inch of effective face width of said rolls, thereby forming the pentaerythritol into flexible sheets, ageing the sheets for approximately 5 to 30 minutes to form brittle sheets, drying the aged brittle sheets to form a pentaerythritol residue containing less than 0.5% of water, and subdividing said dried residue into flakes.

5. The process of treating trimethylolethane particles comprising passing trimethylolethane particles containing approximately 0.5% of water between two oppositely rotating rolls held together with a force of approximately 1,000–1,300 pounds per linear inch of effective face width of said rolls thereby forming the trimethylolethane into sheets, ageing the sheets for approximately 5 to 30 minutes, drying the aged sheets to form a trimethylolethane residue containing less than 0.05% of water, and subdividing said dried residue into flakes.

References Cited in the file of this patent

UNITED STATES PATENTS

| | | |
|---|---|---|
| 1,278,044 | Sinclair | Sept. 3, 1918 |
| 1,806,715 | Schwindt | May 26, 1931 |
| 2,164,986 | Cox et al. | July 4, 1939 |
| 2,436,766 | Davis | Feb. 24, 1948 |
| 2,489,033 | Huntzicker | Nov. 22, 1949 |
| 2,567,909 | Linde | Sept. 11, 1951 |